Patented Oct. 27, 1931

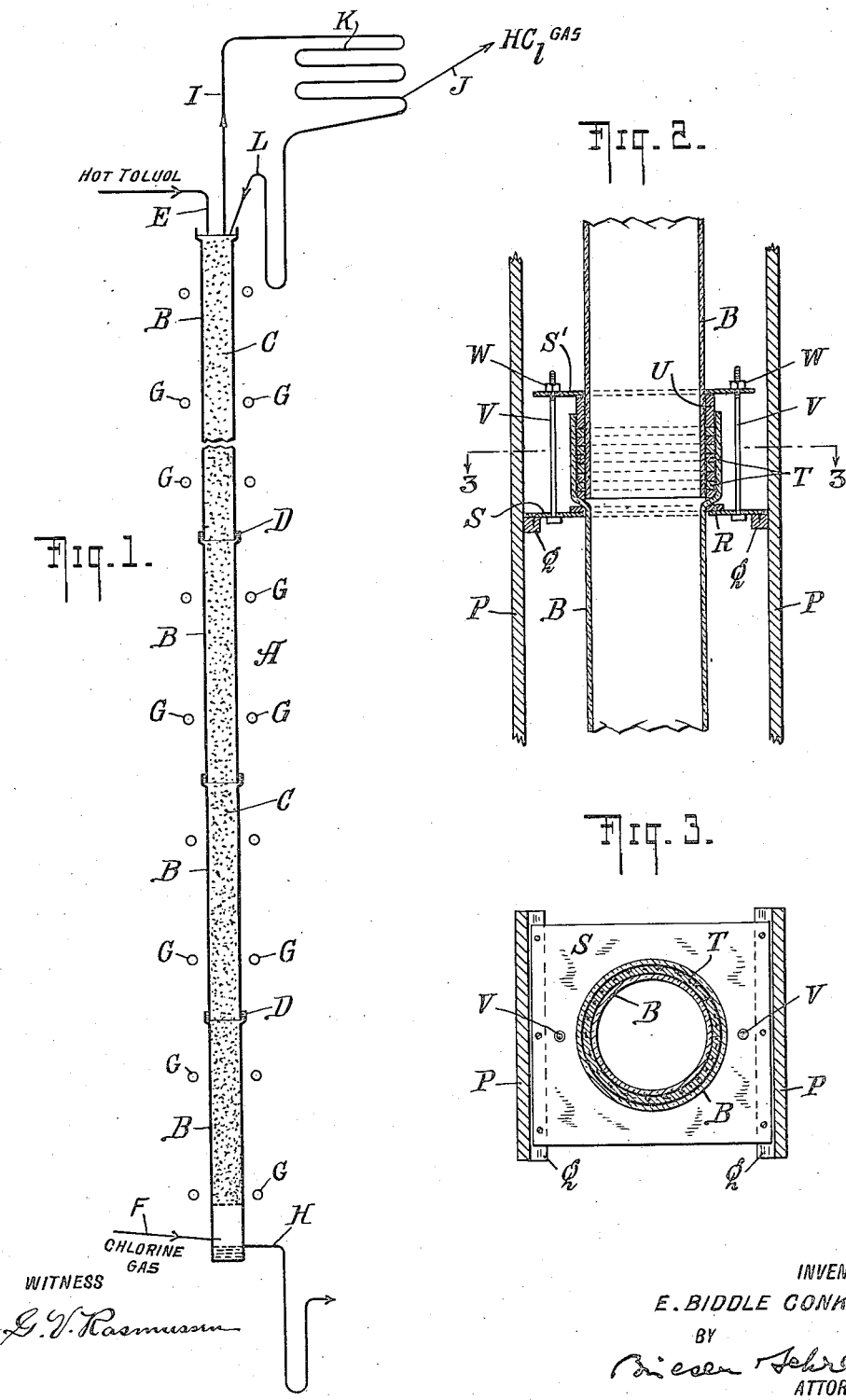

1,828,858

UNITED STATES PATENT OFFICE

EARL BIDDLE CONKLIN, OF SYRACUSE, NEW YORK, ASSIGNOR, BY MESNE ASSIGNMENTS, TO THE SOLVAY PROCESS COMPANY, OF SOLVAY, NEW YORK, A CORPORATION OF NEW YORK

SIDE-CHAIN CHLORINATION OF BENZENE DERIVATIVES

Application filed December 26, 1923. Serial No. 682,712.

This invention relates to the side-chain chlorination of benzene derivatives such as toluol and the particular object of the invention is to produce benzyl chloride by an efficient and continuous procedure.

Heretofore, as outlined in the patent of Gibbs and Geiger, No. 1,246,739 of November 13, 1917, the then prevailing methods for the production of side-chain chlorine substitution products of toluol (benzyl and benzal chloride and benzotrichloride) consisted either (a) of batch or intermittent processes in which a given amount of toluol was treated in liquid form with chlorine gas until the reaction had proceeded to a predetermined point or (b) of processes in which toluol as gas was introduced into suitable apparatus in which it came in contact with gaseous chlorine. In the former or batch process, after the reaction had reached a predetermined point, the charge was removed and treated for the isolation of the desired product in a more or less pure condition. Light or heat or a catalyst, alone or in combination, were used to favor the reaction. An example of a specific process operating along these lines is given in Patent No. 1,345,373 to Kyrides, July 6, 1920. Processes of this character have the disadvantage of fluctuating conditions and relatively large apparatus. Large apparatus is in this case a particular disadvantage on account of the highly inflammable nature of toluol and the necessity of using glass in order to obtain the advantage of illumination either by sunlight or some artificial source of light.

In the other type of process, in which toluol is chlorinated while in gaseous form, it was necessary to employ a temperature above that of the boiling point of toluol (111° C.) and in the reaction product unattacked toluol, which was usually considerable in amount, required to be separated and returned to the system for further treatment. Light or a catalyst or both were employed as accelerating agents. Patent No. 1,202,040, C. Ellis, October 24, 1916, describes such a process and the patent to Gibbs and Geiger first referred to, No. 1,246,739, is for a modification of this second type of process and for the use of ultraviolet rays as the accelerating agent therein. Processes of this character have the disadvantage of working with an inflammable material in vapor form and are confronted with the difficulty of maintaining large apparatus at an elevated temperature and a constant temperature such that condensation does not take place.

The process of this invention, in contradistinction to the processes of the prior art, is one in which the reaction proceeds continuously and in the liquid phase. Uniform conditions are obtained and the output from a unit installation is relatively large. Other advantages will be evident from the detailed description.

Apparatus suitable for the practice of the new process is indicated in the accompanying drawings in which Fig. 1 is a side elevation of the apparatus, Fig. 2 is an enlarged sectional view of a detail and Fig. 3 is a horizontal section on line 3—3 of Fig. 2.

In the drawings A is a tower constructed of sections B of glass filled with suitable packing C such as glass Raschig rings. The glass sections are constituted of a material of the type known in the market as Pyrex glass, a transparent vitreous material which is not destroyed by exposure to heat. Each of the glass sections B of the tower A is approximately 6 inches in diameter and approximately 4 feet in length. A suitable cement D, resistant to chlorine and the other reaction substances, may be used in the connection between adjacent glass sections B and at the various pipe connections hereinafter referred to, although for the glass sections it is preferable to employ packing means like those shown in Figs. 2 and 3. Toluol, preferably hot and in regulated amount, is continuously introduced into the top of the tower at E and dry, pure chlorine gas at F at the bottom of the tower. If sunlight is not available, artificial illumination, such as that from electric or mercury lamps, may be used by placing lamps G at regular intervals around the tower A. The chlorinated and finished product is continuously withdrawn through the line H. The hydrochloric acid gas which is produced by the reaction between the toluol and the chlorine escapes through the line I and leaves the system through the line J and may be utilized by absorption in water with the production of muriatic acid or in any other suitable manner. Any toluol entrained or carried away as vapor in the gas leaving the tower through the line I, is condensed in the cooler K and returned to the tower A at L. The tower A may be conveniently supported as indicated in Figs. 2 and 3 from suitable uprights P with cleats or shelves Q secured thereto at regular intervals. On these cleats Q rest boards S each centrally apertured to support one of the glass sections B, preferably on a cushioning ring R. The annular space between adjacent sections B may be filled with cork rings T suitably treated, as by soaking in glue, said cork rings being surmounted by a lead follower ring U upon which rests a second plate S' similar to S in shape and positioned by the bolts V and nuts W. The bolt V passes loosely through S' so that any desired tightening of the nuts W may be effected. The construction is preferably such that the lower edge of each section B remains out of contact with the upper portion of the next lower section B.

The process as thus described consists essentially in passing a stream of toluol as a liquid at a suitable temperature in countercurrent flow and in intimate contact with a current of chlorine gas, downwardly through a tower transparent to light and which is subjected to sunlight or artificial illumination. With suitable regulation of the temperature and of the amount of toluol introduced through E and of the chlorine introduced through F the reaction proceeds rapidly and no recirculation of the exit liquor from H and no cooling or heating of the tower is required in order to obtain the desired chlorination. Furthermore, practically complete utilization of the chlorine takes place so that very little, if any, chlorine escapes at J. Another result is that practically no chlorination in the benzene ring occurs with the production of ring chlorinated toluol derivatives (chlor toluols) which impurities are difficult to remove. Thus an analysis of a crude benzyl chloride product made in accordance with the new process and having a specific gravity of 1.048 showed only a fraction of one percent. of ring chlorine and over sixteen percent. side-chain chlorine. That corresponds to a benzyl chloride content of over fifty-seven percent. It should, however, be stated that the product to which the foregoing analysis applies was a product of the process as carried out in its early stages and that still more favorable analysis may be developed as the process is practiced on a commercial scale.

For the production of benzyl chloride satisfactory results are obtained when the tower A is approximately 32 feet high and is illuminated every 4 feet with two 200 watt electric lamps. A suitable temperature for the toluol introduced at E is 80 to 100° C. At the lower temperature the liquor returned through L is very small. When the operation is first started, the flow of toluol at E is less than normal and the flow is gradually increased during about the first hour while the required temperature and other chlorination conditions are becoming established throughout the tower. The operation then proceeds practically automatically with a substantially, constant and continuous introduction of toluol at E and a corresponding constant and continuous withdrawal of crude product of the desired gravity at H. The capacity of the apparatus described is about 1800 lbs. of crude benzyl chloride product in twenty-four hours. The toluol may be conveniently supplied directly from a toluol still, the condenser of which is so adjusted as to cool the condensate to only 80 to 100° C. and with a small receiver or trap for the condensate provided with a constant level over-flow so that the flow through E is independent of the fluctuations in operation of the still.

The various gas and liquor lines E, F, H, I, L, K and J are preferably made of glass or of lead.

The crude products from H may be treated in a variety of ways for the isolation of the chlorine derivative depending on the purity desired. For example, it may be first washed with a suitable alkali such as sodium carbonate solution until it no longer reacts acid, whereupon it is fractionally distilled in vacuo.

The process has been described with particular reference to the production of benzyl chloride but with proper adjustments it should be suitable for further chlorination of toluol to produce benzal chloride and benzotrichloride and for the production of side-chain chlorine substitution products of other side-chain aromatic hydrocarbons besides toluol.

The invention thus contemplates the treatment not only of toluol but of its homologues and when in the claims the phrase "hydrocarbon of the type of toluol" is used, it is intended to refer to toluol or any homologous side-chain aromatic hydrocarbon.

It will be apparent that a glass tower 30 feet or so in height and 6 inches or so in diameter and composed of a multiplicity of tubular glass units is a tower which is not self-supporting but requires support from the exterior. In this art the use of a glass tower of this type is, so far as the applicant is aware, entirely novel. Other material than glass may be used in the construction of such a tower provided it possesses the qualities of transparency, durability and resistance to the chemicals to which it is exposed and the temperatures involved. Where in the claims effective light rays are referred to, they are intended to include all those rays or emanations which favor halogenation whether such rays are luminous or invisible.

Numerous modifications in the detail of construction and operation may obviously be employed without departing from the spirit of this invention.

I claim:

1. In the art of chlorinating a hydrocarbon of the type of toluol, the process which consists in exposing a flowing stream of the material to be chlorinated to an oppositely flowing stream of chlorine gas and simultaneously feeding the stream of material to be chlorinated past a zone of effective light rays and maintaining the material during this treatment in a condition of liquidity and intimate contact with the chlorine gas while the gaseous chlorine and liquid hydrocarbon are in reactive relation with each other.

2. The process which comprises establishing and maintaining a regulated flow of a hot hydrocarbon of the type of toluol into a reaction chamber of a predetermined length, causing the same to flow in a downward direction thru said chamber past a zone of effective light rays in a state of continuous liquidity and intimate contact with a regulated counter-current flow of chlorine gas, and withdrawing from the reaction chamber the product formed, whereby the product will continuously possess an approximately constant predetermined specific gravity.

3. In the art of chlorinating toluol, the process which comprises passing a heated liquid stream of the hydrocarbon to be chlorinated into contact with an oppositely flowing stream of chlorine gas and exposing the streams as they flow in opposite directions in contact with each other to effective light rays, collecting the resulting chloride, subjecting the resulting hydrochloric acid gas and the vaporized portion of the hydrocarbon to condensation, returning the condensed hydrocarbon to the hydrocarbon stream, and removing the hydrochloric acid gas.

4. In the art of chlorinating a hydrocarbon of the type of toluol, the process which comprises establishing a continuous flow in a state of fine division of heated liquid constituted of the hydrocarbon to be chlorinated and simultaneously effecting contact between said flowing liquid and chlorine gas continuously flowing in an opposite direction, exposing the two reagents as they flow in opposite directions in contact with each other, to effective light rays, and continuously withdrawing the resultant chlorinated product and the hydrochloric acid gas formed as the result of the reaction between the two reagents.

5. In the art of chlorinating a hydrocarbon of the type of toluol, the process which consists in exposing a flowing stream of the material to be chlorinated to chlorine gas and simultaneously feeding the stream of material to be chlorinated past a zone of effective light rays and maintaining the material during this treatment in a condition of intimate contact with said chlorine gas.

6. In the art of chlorinating a hydrocarbon of the type of toluol, the process which comprises passing a heated liquid stream of the hydrocarbon to be chlorinated thru a conduit transparent to light, passing a stream of chlorine gas thru said conduit in intimate contact with and in counter-current flow to said stream of hydrocarbon, and exposing the streams as they flow in opposite directions to effective light rays.

In testimony whereof I have hereunto set my hand.

E. BIDDLE CONKLIN.

CERTIFICATE OF CORRECTION.

Patent No. 1,828,858.                                    Granted October 27, 1931, to

EARL BIDDLE CONKLIN.

It is hereby certified that error appears in the printed specification of the above numbered patent requiring correction as follows: Page 2, line 95, for "products" read product; page 3, line 35, claim 3, after "chlorinating" insert a hydrocarbon of the type of; and that the said Letters Patent should be read with these corrections therein that the same may conform to the record of the case in the Patent Office.

Signed and sealed this 22nd day of December, A. D. 1931.

(Seal)                                                                  M. J. Moore,
Acting Commissioner of Patents.